United States Patent
Claes

(10) Patent No.: US 6,424,258 B1
(45) Date of Patent: Jul. 23, 2002

(54) REDUNDANT PROCESS CONTROL SYSTEM

(75) Inventor: Joseph Claes, Ham-sur-Heure (BE)

(73) Assignee: Cegelec Acec S.A., Charleoi (BE)

( * ) Notice: Subject to any disclaimer, the term of this patent is extended or adjusted under 35 U.S.C. 154(b) by 0 days.

(21) Appl. No.: 09/362,609

(22) Filed: Jul. 28, 1999

(30) Foreign Application Priority Data

Jul. 29, 1998 (EP) .......................................... 98870165

(51) Int. Cl.⁷ .............................................. G08B 29/00
(52) U.S. Cl. ...................... 340/514; 340/505; 340/506; 340/538; 340/310.01; 340/825.06
(58) Field of Search ................................ 340/514, 506, 340/505, 538, 310.01, 825.06

(56) References Cited

U.S. PATENT DOCUMENTS 4,962,368 A * 10/1990 Dobrzanski et al. ........ 340/514
5,475,363 A * 12/1995 Suzuki et al. ............... 340/506

* cited by examiner

Primary Examiner—Daryl Pope
(74) Attorney, Agent, or Firm—Lee, Mann, Smith, McWilliams Sweeney & Ohlson

(57) ABSTRACT

The present invention relates to a redundant process control system including at least one control unit (PLC1) which produces an output signal (S1) resulting from a control function being applied to a set of input signals (E1). In addition, the system includes at least one test member (TES1) that is different from said control unit, which test member produces a test signal resulting from said control function being applied to said set of input signals (E1) and generates an alarm (AL1) whenever there is a difference between said test signal and the corresponding output signal (S1).

8 Claims, 1 Drawing Sheet

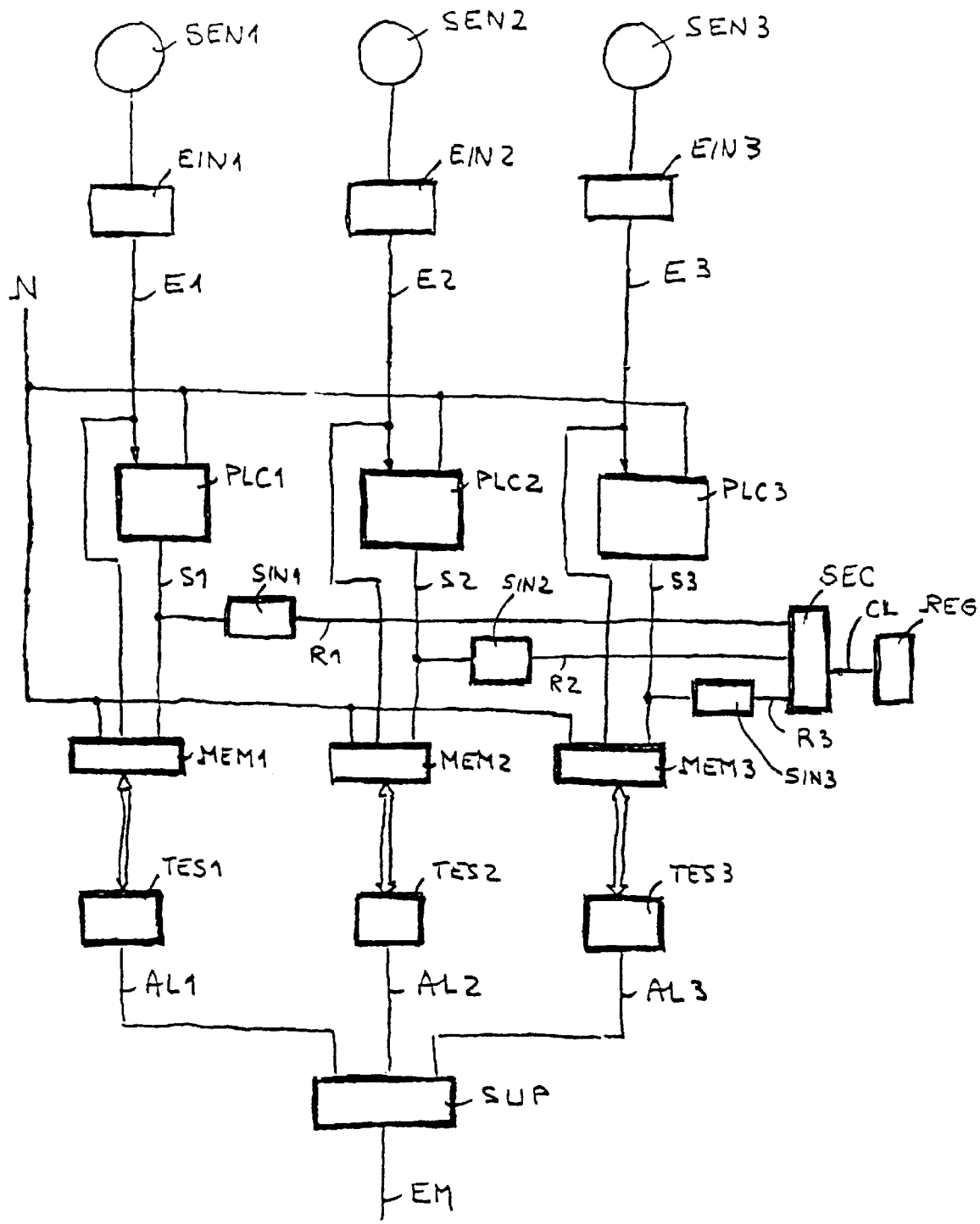

REDUNDANT PROCESS CONTROL SYSTEM

BACKGROUND OF THE INVENTION

The present invention relates to a redundant process control system including a control unit performing a control function; however, provision is often made to use a plurality of identical control units for performing said control function.

The field of the invention is that of high-integrity applications in which safety is of prime importance, thereby justifying duplication of the control units in order to combat any random errors that may occur in any one of the units. The processes concerned are of a wide variety of types and are often industrial. By way of example, mention may be made of controlling nuclear power plants, rail signalling, and controlling chemical reactors.

Currently, such a safe system often includes at least three qualified programmable logic controllers. Such a programmable logic controller essentially comprises a processor and a working memory in which a program for performing the process is recorded, the program being executed by the processor. The programmable logic controllers are qualified, i.e. firstly the processor is subjected to extremely tough tests and secondly the program satisfies very stringent development standards, such as, for example, the IEC 880 Standard in nuclear applications.

All three programmable logic controllers are identical, in particular as regards the processor and the program, and each of them produces a respective output signal.

Furthermore, the system frequently includes a security member which produces a control signal resulting from majority voting being applied to the adjustment signals derived from the signals output by the processors. In other words, the control signal takes the value of the majority adjustment signals. It is thus possible to overcome the problem of random error in one of the programmable logic controllers provided that the other two programmable logic controllers produce output signals that are identical.

Unfortunately, the complexity of the very large scale integration components such as the processors of the programmable logic controllers makes it impossible to perform end-of-manufacture testing that is absolutely reliable. During use, design or manufacturing defects can be observed that were not detected during testing. There is a high probability of such defects appearing in several components from the same manufacturing batch, for example, and so all three of the processors of the safe system can produce erroneous output signals, thereby reducing the effectiveness of the security member to zero. That type of defect is generally referred to as a "generic failure".

Similarly, a defect that is not detected in developing the program gives rise to equivalent consequences in the safe system. The whole purpose of qualifying a program strictly is to reduce the number of defects to as low a number as possible, but that requires the program to be limited to one identified process. Therefore, since the program is not used widely, it is even less likely for the hidden defects to show up quickly in use and to be corrected through feedback from users.

An object of the present invention is thus to combat the common causes of failure in a safe process control system.

SUMMARY OF THE INVENTION

In the invention, a redundant process control system includes at least one control unit which produces an output signal resulting from a control function being applied to a set of input signals, and said system includes at least one test member that is different from said control unit, which test member produces a test signal resulting from said control function being applied to the set of input signals and generates an alarm whenever there is a difference between the test signal and the output signal.

Preferably, the system includes a plurality of identical control units, each control unit producing a respective output signal resulting from the control function being applied to a respective set of input signals.

Since the test member is different from the control units, it is highly unlikely for it to be affected by a generic failure of the units, and the alarm thus generated makes it possible to identify such a defect.

Optionally, the system further includes a security member for producing a control signal, in particular whenever there is a difference between the adjustment signals derived from the output signals.

In an advantageous embodiment, the control signal corresponds to majority voting being applied to the adjustment signals.

By way of example, with each of the control units and the test member including a processor associated with a working memory in which a program for performing the process is recorded, the program or the processor of the test member is different from the corresponding program or processor in each of the control units.

Preferably, the test member produces the test signal at the same time as said control units produce the corresponding output signals.

In order to increase safety further, it is possible to make provision for the system to include a corresponding plurality of test members, each of which receives a distinct output signal, and for the system also to include a supervision member for producing a warning signal resulting from majority voting being applied to the alarms generated by said test members.

BRIEF DESCRIPTION OF THE DRAWINGS

The present invention appears in more detail in the following description of embodiments given by way of example and with reference to the accompanying sole figure which shows the main elements required in implementing a safe system.

DESCRIPTION OF THE PREFERRED EMBODIMENT

As shown in the figure, an installation conventionally includes three sensors SEN1, SEN2, SEN3 for measuring the same parameter of the process that is to be controlled. Each of the sensors produces a respective analog signal, and they are followed by respective input interfaces EIN1, EIN2, EIN3 for converting the analog signals into digital signals.

The system includes identical first, second, and third programmable logic controllers PLC1, PLC2, and PLC3 receiving respective first, second, and third input signals from respective ones of the interfaces EIN1, EIN2, EIN3. The programmable logic controllers produce respective first, second, and third output signals S1, S2, and S3. In addition, first, second, and third output interfaces SIN1, SIN2, and SIN3 are provided that receive respective ones of the first, second, and third output signals S1, S2, and S3 and that produce respective first, second, and third adjustment signals R1, R2, and R3. The three programmable logic controllers are further connected to a network N which enables data to be interchanged between the various elements of the system.

Thus, in this example, the three input signals come from three distinct sensors. By using a diversity of sensors in this way, the reliability of the system is further improved. However, the invention also applies when a single sensor is used, i.e. when the three input signals coincide in the form of a single signal.

Furthermore, an identified control function of the process may require a plurality of parameters to produce a determined output signal.

Thus, each of the programmable logic controllers PLC1, PLC2, PLC3 receives a set of input signals E1, E2, E3, each set comprising one or more signals, each of which corresponds to a single process parameter.

The programmable logic controllers are identical, and they therefore include identical processors for executing an identical program containing said control function. The program is recorded in what may conventionally be called a "working memory". The various components of the programmable logic controller are not shown in the figure because they are part of the state of the art.

The system also often includes a security member SEC which performs majority voting on the three adjustment signals R1, R2, R3. When the three adjustment signals are binary signals, the control signal CL produced by the member takes the value of the at least two signals that are identical.

By way of example, if "*" designates the "AND" logic operator and "+" designates the "OR" logic operator, then a logic function which makes it possible to obtain the control signal CL takes the following form:

$$CL=R1*R2+R2*R3+R3*R1$$

It is also specified that if the adjustment signals are analog signals, the control signal may then be represented by the following expression:

$$CL=\mathrm{Max}[\mathrm{Min}(R1, R2), \mathrm{Min}(R2, R3), \mathrm{Min}(R3, R1)]$$

The control signal CL is applied to an adjustment member REG which is itself assigned to controlling an actuator depending on the control function.

In the invention, the system further includes a first test member TES1 which accesses the network N, the first set of input signals E1, and the first output signal S1, all via a first dual-access memory MEM1.

Thus, the test member is connected to the direct digital accesses of the programmable logic controller and not, as is generally the case, to the sensor or actuator accesses. This member thus receives the signals as processed by the programmable logic controller independently of any input or output interface.

The test member TES1 includes a processor which is preferably different from the processor of the three programmable logic controllers. Advantageously, the processor of the test member is a commonly-available industrial component, unlike the qualified processors of the programmable logic controllers.

The processor of the test member produces a first test signal by applying the control function to the first set of input signals E1, by means of a program which is preferably distinct from the program implemented in the three programmable logic controllers. Advantageously, the program implemented in the test member is developed using industrial methods that are not subjected to stringent standards, so that it is low-cost.

The invention thus proposes a diversity of items of equipment for performing the same control function, namely firstly the first programmable logic controller PLC1 and secondly the first test member TES1. Maximum diversity is obtained when the processors and the programs of the two items of equipment are different, but the invention is also applicable if only the processors or only the programs are different.

After it has produced the first test signal, the test member TES1 compares the signal with the first output signal S1. If these two signals are different, it generates a first alarm AL1. In the case of an industrial process, the alarm can be transmitted to the installation control room, thereby warning the staff in charge of the installation.

Preferably, the test member is at least as fast as the programmable logic controllers so that any alarm is generated almost at the same time as the first output signal S1 appears. Thus, the first alarm AL1 is produced as quickly as possible.

During factory testing or commissioning of the system, unwanted alarms can be generated as a result of abnormal divergence between the test signal and the first output signal. The control function, e.g. a filtering algorithm, can differ somewhat between the program of the test member and the program of the programmable logic controller. In which case, the required modifications should be made in the test member so that a false alarm is not generated.

It appears that by analyzing the situations leading to the generation of an alarm under real operating conditions and over time, it is possible to show up any operating defects both in the programmable logic controller and in the test member. The corrections made to the test member to remedy such defects in the event of false alarms make it possible gradually to qualify the member for the process in question.

When, as a result of the various corrections made, divergences between the test member and the programmable logic controller are declared to be exceptional, then any alarm generated by the test member can be inserted into a safety chain for making control of the installation safe. It is even possible to make provision for the alarm to cause an emergency stop if safety is to be given preference over availability in the installation.

The invention also makes provision to duplicate the test members in the same way as the programmable logic controllers are duplicated.

Thus, advantageously, a second test member TES2 analogous to the first test member TES1 accesses the network N, the second set of input signals E2, and the second output signal S2, all via a second dual-access memory MEM2 so as to produce a second test signal by applying the control function to the second set of input signals E2. The second test member TES2 generates a second alarm AL2 when there is a difference between the second test signal and the second output signal S2.

Similarly, a third test member TES3 which is analogous to the first test member TES1 accesses the network N, the third set of input signals E3, and the third output signal S3, all via a third dual-access memory MEM3 so as to produce a third test signal by applying the control function to the third set of input signals E3. The third test member TES3 generates a third alarm AL3 in the event of a difference between the third test signal and the third output signal S3.

The three test members may be different in terms both of hardware and of software.

The system further includes a supervision member SUP which produces a warning signal EM by applying majority voting to the alarms AL1, AL2, and AL3 delivered by the three test members TES1, TES2, and TES3, i.e. if at least two of the three alarms are present in the example used.

Naturally, the warning signal EM acts equivalently to the first alarm AL1 when the system includes a single test member, namely the first test member TES1. Thus, the remarks made about the first alarm AL1 also apply to the warning signal EM.

In the description above, it is considered that the safe system includes three programmable logic controllers. The invention is also applicable for a higher number of programmable logic controllers.

However, it is possible to consider applying the invention when only two programmable logic controllers are provided in the system. In which case, the security member cannot perform majority voting, and it can merely identify any disparity between the signals output by the two programmable logic controllers by means of the control signal CL. The control signal is then used by the system as a conventional alarm.

It is even possible to consider using a single programmable logic controller, in which case the security member is omitted.

It should also be specified that the signals output by the various programmable logic controllers may be binary signals. Otherwise, the corresponding test member is organized so that it produces an alarm if the relevant test signal and the relevant output signal present a difference that exceeds a predetermined threshold.

The invention may apply to any type of control unit whose task is to perform process control. This applies to programmable logic controllers, and more generally to programmable components referred to as "controllers".

The embodiments of the invention that are given above are chosen because they are general examples. It is impossible to list exhaustively all of the embodiments covered by the invention. In particular, any of the means described may be replaced by equivalent means without going beyond the ambit of the present invention.

What is claimed is:

1. A redundant process control system including at least one control unit (PLC1) which produces an output signal (S1) resulting from a control function being applied to a set of input signals (E1); said system being characterized in that it includes at least one test member (TES1) that is different from said control unit, which test member produces a test signal resulting from said control function being applied to said set of input signals (E1) and generates an alarm (AL1) whenever there is a difference between said test signal and said output signal (S1).

2. A system according to claim 1, characterized in that it includes a plurality of identical control units (PLC1, PLC2, PLC3), each control unit producing a respective output signal (S1, S2, S3) resulting from said control function being applied to a respective set of input signals (E1, E2, E3).

3. A system according to claim 2, characterized in that it further includes a security member (SEC) for producing a control signal (CL), in particular whenever there is a difference between the adjustment signals (R1, R2, R3) derived from said output signals (S1, S2, S3).

4. A system according to claim 3, characterized in that said control signal (CL) corresponds to majority voting being applied to said adjustment signals (R1, R2, R3).

5. A system according to claim 1, characterized in that, with each of said control units (PLC1, PLC2, PLC3) and said test member (TES1) including a processor associated with a working memory in which a program for performing the process is recorded, the program of said test member is different from the program in each of said control units.

6. A system according to claim 1, characterized in that, with each of said control units (PLC1, PLC2, PLC3) and said test member (TES1) including a processor associated with a working member in which a program for performing the process is recorded, the processor of said test memory is different from the processor of each of said control units.

7. A system according to claim 1, characterized in that said test member (TES1) produces said test signal at the same time as said control units (PLC1, PLC2, PLC3) produce the corresponding output signals (S1, S2, S3).

8. A system according to claim 2, characterized in that, with said system including a corresponding plurality of test members (TES1, TES2, TES3), each of which receives a distinct output signal (S1, S2, S3), said system further includes a supervision member (SUP) for producing a warning signal (EM) resulting from majority voting being applied to the alarms (AL1, AL2, AL3) generated by said test members.

* * * * *